United States Patent
Chuang

(10) Patent No.: US 11,964,728 B2
(45) Date of Patent: Apr. 23, 2024

(54) BICYCLE CONTROL DEVICE

(71) Applicant: GIANT MANUFACTURING CO., LTD., Taichung (TW)

(72) Inventor: Cheng-Ru Chuang, Taichung (TW)

(73) Assignee: Giant Manufactoring Co., Ltd., Taichung (TW)

( * ) Notice: Subject to any disclaimer, the term of this patent is extended or adjusted under 35 U.S.C. 154(b) by 0 days.

(21) Appl. No.: 17/965,915

(22) Filed: Oct. 14, 2022

(65) Prior Publication Data

US 2023/0118027 A1 Apr. 20, 2023

(30) Foreign Application Priority Data

Oct. 15, 2021 (TW) .................. 110212194

(51) Int. Cl.
*B62M 25/04* (2006.01)
*B62K 19/30* (2006.01)
*B62K 23/06* (2006.01)

(52) U.S. Cl.
CPC ............. *B62M 25/04* (2013.01); *B62K 19/30* (2013.01); *B62K 23/06* (2013.01)

(58) Field of Classification Search
None
See application file for complete search history.

(56) References Cited

U.S. PATENT DOCUMENTS

| | | | |
|---|---|---|---|
| 3,596,530 A | 8/1971 | Yoshigai | |
| 3,719,104 A | 3/1973 | Dian | |
| 4,100,820 A * | 7/1978 | Evett | B62M 25/04 192/217 |
| 5,493,933 A | 2/1996 | Kelly | |
| 2008/0202277 A1* | 8/2008 | Miki | B62K 23/06 74/502.2 |
| 2016/0059925 A1* | 3/2016 | Miki | B62M 25/04 74/502.2 |
| 2018/0285807 A1* | 10/2018 | Miyazaki | B62K 23/02 |

FOREIGN PATENT DOCUMENTS

| | | |
|---|---|---|
| EP | 1955937 A2 | 8/2008 |
| FR | 2437974 A1 | 4/1980 |
| TW | M587146 U | 12/2019 |

OTHER PUBLICATIONS

Extended European Search Report corresponding to Application No. 22201501.8 dated Feb. 20, 2023, 8 pages.

* cited by examiner

*Primary Examiner* — Vicky A Johnson
(74) *Attorney, Agent, or Firm* — Innovation Counsel LLP

(57) ABSTRACT

A bicycle control device arranged on a curved handlebar of a bicycle and used to adjust a component of the bicycle is provided. The curved handlebar includes a straight section and a curved section extending from both ends of the straight section. The control device includes a fastener, a first connecting rod and a second connecting rod. The fastener has a hollow space for the curved handlebar to pass through, a first pivoting portion and a second pivoting portion. The first connecting rod has a third pivoting portion and a first pulling portion, wherein the first connecting rod is pivoted to the first pivoting portion through the third pivoting portion. The second connecting rod has a fourth pivoting portion and a second pulling portion, wherein the second connecting rod is pivoted to the second pivoting portion through the fourth pivoting portion.

9 Claims, 6 Drawing Sheets

BICYCLE CONTROL DEVICE

This application claims the benefit of Taiwan application Serial No. 110212194, filed Oct. 15, 2021, the subject matter of which is incorporated herein by reference.

BACKGROUND

Technical Field

The disclosure relates in general to a bicycle, and more particularly to a bicycle control device.

Description of the Related Art

To enhance the maneuverability and comfort, the curve handlebar of a conventional road bike is designed to have a straight section for flat handle and a curved section for racing handle. The remote wire control device of a bicycle can only be used on the off-road bike with a flat handlebar, and cannot be used on the road bike whose curved handlebar has multiple handling positions. It is commonly seen that the road bike rider cannot operate the wire control device when the rider's hand is at the lower (racing) handling position.

Moreover, remote wire control devices of the bicycle are operated by way of thumb pressing, and most wire control devices only have one operation mode, which cannot be changed according to the holding positions of the rider's hand. An attempt, which allows the rider to change the operation modes regardless of the rider's hand being at the upper handling position or the lower handling position, was made on a lever design. However, the lever is too huge and increases too much weight, and the operation of the lever surrounding the only axis line is not smooth and may even cause safety issues. Therefore, the conventional design still needs to be improved further.

SUMMARY OF THE DISCLOSURE

The disclosure is directed to a bicycle control device, arranged on a curved handle of a bicycle, which allows a road bike rider to change the operation modes to enhance the maneuverability and comfort according to the holding position of rider's hand.

The disclosure is directed to a bicycle control device, which has two connecting rods for the rider to flip and change the operation modes corresponding to the upper handling position and the lower handling position, so that the rider can adjust his/her riding posture according to the real state of the road condition.

The disclosure is directed to a bicycle control device, which allows the rider to flip and operate with the index finger or the middle finger. No matter the rider's hand is at the upper handling position or the lower handling position of the curved handlebar, the wire control device does not occupy the handle holding region of the curved handlebar and make the rider unable to hold the handle with the thumb.

According to one embodiment of the present disclosure, a bicycle control device arranged on a curved handlebar of a bicycle and used to adjust a component of the bicycle is provided. The curved handlebar includes a straight section and a curved section extending from both ends of the straight section. The control device includes a fastener, a first connecting rod and a second connecting rod. The fastener is fixed on the curved handlebar, and has a hollow space for the curved handlebar to pass through, a first pivoting portion and a second pivoting portion. The first connecting rod has a third pivoting portion and a first pulling portion, wherein the first connecting rod is pivoted to the first pivoting portion through the third pivoting portion. The second connecting rod has a fourth pivoting portion and a second pulling portion, wherein the second connecting rod is pivoted to the second pivoting portion through the fourth pivoting portion.

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

Figure 1A:
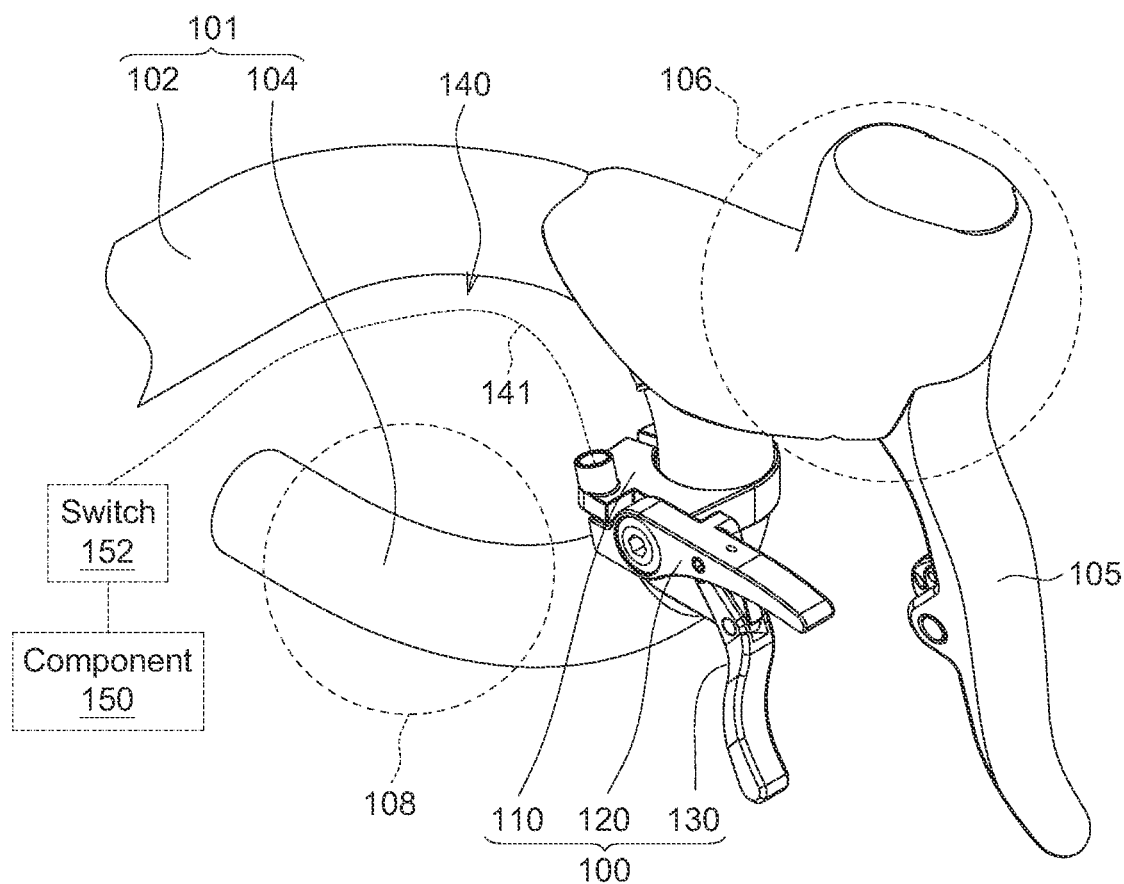
FIGS. 1A and 1B respectively are schematic diagrams of a bicycle control device arranged on a handle according to an embodiment of the disclosure.
Figure 1B:
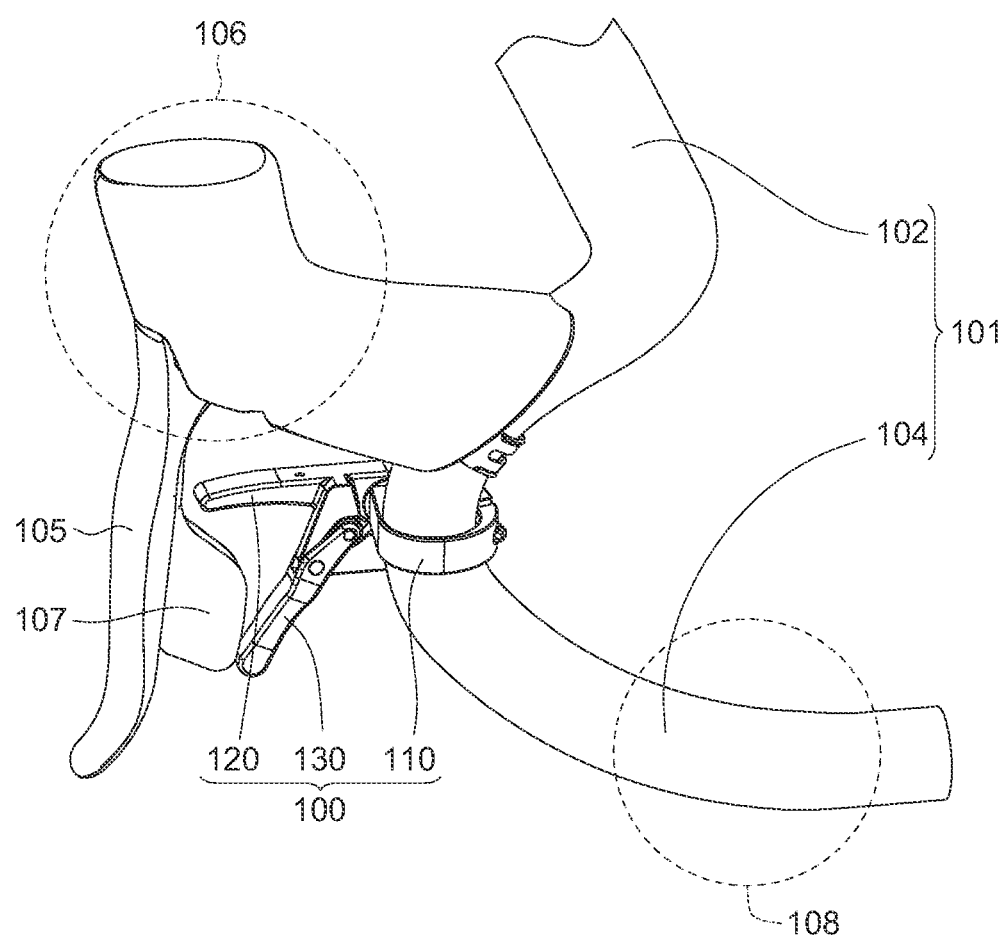
Figure 2:
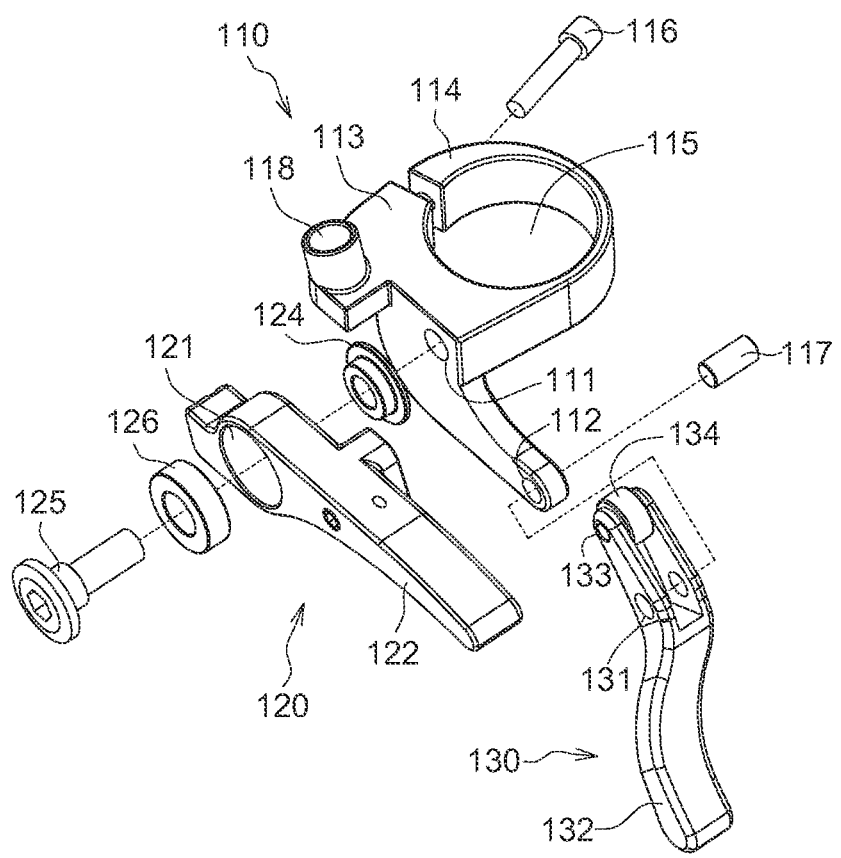
FIG. 2 is an explosion diagram of a bicycle control device according to an embodiment of the disclosure.
Figure 3A:
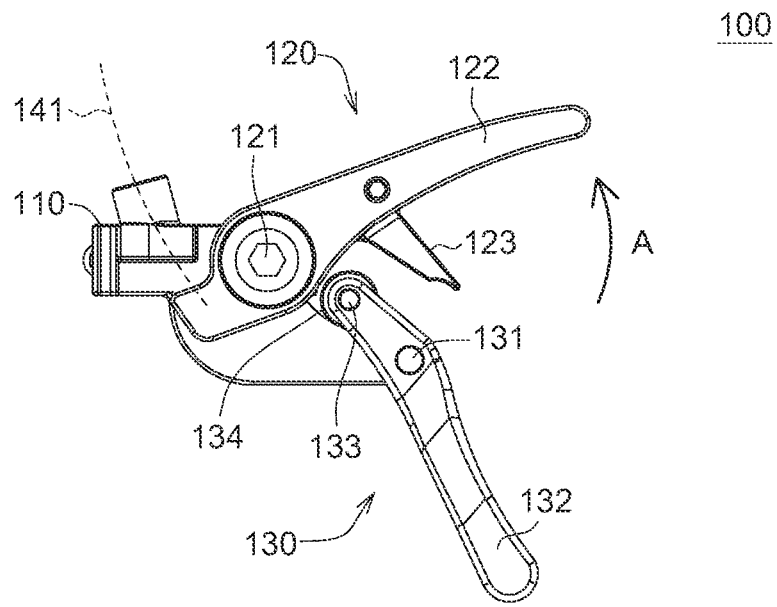
FIGS. 3A and 3B respectively are operational diagrams of a bicycle control device according to an embodiment of the disclosure.
Figure 3B:
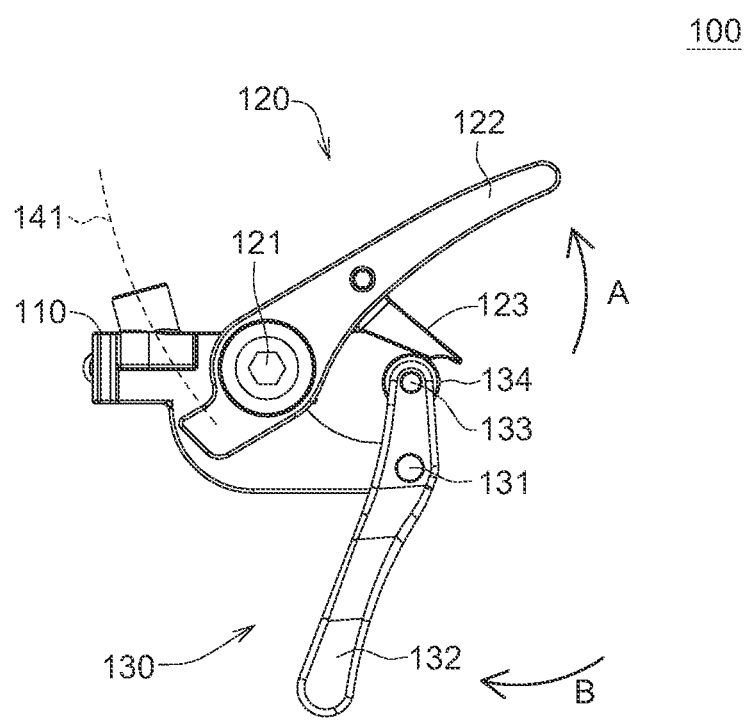

FIGS. 1A and 1B respectively are schematic diagrams of a bicycle control device 100 arranged on a handle according to an embodiment of the disclosure. FIG. 2 is an explosion diagram of a bicycle control device 100 according to an embodiment of the disclosure. FIGS. 3A and 3B respectively are operational diagrams of a bicycle control device 100 according to an embodiment of the disclosure. As indicated in FIG. 1A, the bicycle control device 100 can be realized by a wire control device arranged on a curved handle 101 of a bicycle. The bicycle control device 100 is user friendly, provides more than two control modes and allows the rider to change the operation modes through the upper handling position 106 or the lower handling position 108 of the ride's hand.

The bicycle control device 100 is arranged on a curved handlebar 101 of a bicycle and is used to adjust a component 150 of the bicycle. The component 150 can be a seat tube lifter or a shock absorber device. Since the component 150 is a generally know element, only brief explanations rather than detailed descriptions or structures of the component 150 are provided.

In an embodiment, the seat tube lifter enables the rider to adjust the seat height by adjusting the length of the seat tube during the ride. The lifter switch of the seat tube lifter is connected with a wire control component 140. A control wire 141 of the wire control component 140 is used to activate the switch 152 (such as the lifter switch) of the seat tube lifter. The lifter switch can be, for example, an actuator switch of a pneumatic cylinder or a hydraulic cylinder. In another embodiment, a shock absorber device can be used to adjust the shock absorption level; the switch 152 (such as valve) of the shock absorber device is connected with the wire control component 140; the control wire 141 of the wire control component 140 is used to activate the switch 152 to select the shock absorption level suitable for the current state of the road surface which may be bumpy or flat.

Refer to FIG. 1A. The curved handlebar 101 includes a straight section 102 and a curved section 104 extending from both ends of the straight section 102. The straight section 102 and the curved section 104 are connected at the upper handling position 106. The lower handling position 108 is the part of the curved section 104 close to the terminal end. In an embodiment, a brake is arranged at the connection between the straight section 102 and the curved section 104 of the curved handlebar 101, and has a brake lever 105 extending downwards for the rider to clench. The brake lever 105 can further enable the rider to drag the brake wire. Refer to FIG. 1B. In another embodiment, a derailleur lever 107 is arranged on the brake lever 105 of the brake for the rider to flip left and right to change the gear position.

As indicated in FIG. 1A, the bicycle control device 100 of the present embodiment is arranged at the redundant space between the brake lever 105 and the curved section 104 of the handle. The bicycle control device 100 is close to an inner side of the brake lever 105 and staggers with an inner side of the curved section 104 of the handlebar, so that when the brake lever 105 is pressed inwards and moves towards the curved section 104 of the handlebar, the brake lever 105 does not interfere with the bicycle control device 100.

In the present embodiment, the bicycle control device 100 can be arranged on an inner side of the left handlebar and staggers with the left brake lever 105. The left brake lever 105 is arranged at the front of the bicycle control device 100, and the bicycle control device 100 is arranged at the back of the left brake lever 105. Therefore, the rider's left hand can extend forwards to clench the brake lever 105. When the rider's left hand withdraws, the rider's left hand can clench the bicycle control device 100. Thus, the rider can complete multiple operations disclosed above with one single hand. Moreover, the bicycle control device 100 is not limited to be arranged at the inner side of the left handlebar. For instance, the bicycle control device 100 can be arranged at other position such as the inner side of the right handlebar.

Refer to FIGS. 1A and 1B. The bicycle control device 100 includes a fastener 110, a first connecting rod 120 and a second connecting rod 130. The fastener 110 can be tightly fixed on the curved handlebar 101, preferably, between the upper handling position 106 and the lower handling position 108 of the curved handlebar 101, lest the fastener 110 might occupy the handle holding region and make the rider unable to hold the handlebar with the thumb. Refer to FIG. 2. The fastener 110 has a hollow space 115 for the curved handlebar 101 to pass through. The fastener 110 has a first half ring 113 and a second half ring 114, which surround the curved handle 101. The fastener 110 has a fixing screw 116 enabling the first half ring 113 and the second half ring 114 to be engaged with each other. The fixing screw 116 can adjust the tightness of the fastener 110.

Refer to FIG. 2. The fastener 110 has a first pivoting portion 111 and a second pivoting portion 112. The first connecting rod 120 has a third pivoting portion 121, and the second connecting rod 130 has a fourth pivoting portion 131. The first pivoting portion 111 and the third pivoting portion 121 are parallel and opposite to each other, and the second pivoting portion 112 and the fourth pivoting portion 131 are parallel and opposite to each other. The first connecting rod 120 is pivoted to the first pivoting portion 111 through the third pivoting portion 121, and the second connecting rod 130 is pivoted to the second pivoting portion 112 through the fourth pivoting portion 131.

Refer to FIG. 2. A fixing screw 125 is inserted into the first pivoting portion 111 and the third pivoting portion 121 to fix the first connecting rod 120 on the fastener 110. A fixing rod 117 is inserted into the second pivoting portion 112 and the fourth pivoting portion 131 to fix the second connecting rod 130 on the fastener 110. The first connecting rod 120 is located above the second connecting rod 130.

Refer to FIG. 2. A pad 124 is interposed between the first pivoting portion 111 and the third pivoting portion 121. A ball bearing 126 is arranged at the third pivoting portion 121. The fixing screw 125 can pass through the ball bearing 126 and the pad 124 to be fixed on the first pivoting portion 111 of the fastener 110 from the outside of the first connecting rod 120. The fixing screw 125 can serve as a shaft of the pivoting portion of the first connecting rod 120. The ball bearing 126 can increase the lubricity of the first connecting rod 120 to facilitate the rotation of the first connecting rod 120. Similarly, the fixing rod 117 can serve as a shaft of the pivoting portion of the second connecting rod 130 to facilitate the rotation of the second connecting rod 130.

Refer to FIGS. 1A, 1B and 2. In an embodiment, the wire control component 140 includes a control wire 141, and the upper edge of the fastener 110 has a through hole 118. The control wire 141 of the wire control component 140 passes through the through hole 118 to be connected to the first connecting rod 120. Furthermore, the other end of the control wire 141 is connected to a component 150 of the bicycle. The component 150 has a switch 152. The control wire 141 can be pulled by the first connecting rod 120 to activate the switch 152.

Refer to FIG. 3A. When the first connecting rod 120 is flipped to be pivotally rotated around the third pivoting portion 121 as an axis, the third pivoting portion 121 merely rotates without moving, and the control wire 141 can be pulled by the first connecting rod 120. Refer to FIG. 3B. When the second connecting rod 130 is flipped to be pivotally rotated around the fourth pivoting portion 131 as an axis, the fourth pivoting portion 131 merely rotates without moving, and the first connecting rod 120 can be flipped by the second connecting rod 130, then the control wire 141 is again pulled by the first connecting rod 120.

Refer to FIGS. 3A and 3B. The first connecting rod 120 has a first pulling portion 122; the second connecting rod 130 has a second pulling portion 132. The first pulling portion 122 is located above the second pulling portion 132 and has an extension member 123 extending toward second pulling portion 132. The extension member 123 and the first pulling portion 122 can be integrally formed in one piece. The extension member 123 correspondingly contacts the top of an actuating end 133 of the second connecting rod 130, so that the first pulling portion 122 and the second pulling portion 132 have the following relationships. As indicated in FIG. 3A, when the first connecting rod 120 is controlled through the first pulling portion 122, the second connecting rod 130 does not move. As indicated in FIG. 3B, when the second connecting rod 130 is controlled through the second pulling portion 132, the first connecting rod 120 is driven by the second connecting rod 130 to move. Furthermore, the pivoting direction of the first pulling portion 122 is inverse to the pivoting direction of the second pulling portion 132, wherein the pivoting directions are indicated by arrows A and B.

Refer to FIG. 3A. When the first connecting rod 120 is pivotally rotated upwards through the first pulling portion 122 (such as the anti-clockwise direction indicated by the arrow A), the extension member 123 does not contact the actuating end 133 of the second connecting rod 130, therefore the second connecting rod 130 does not actuate.

Refer to FIG. 3B. When the second connecting rod 130 is pivotally rotated downwards through the second pulling portion 132 (such as the clockwise direction indicated by the arrow B), the actuating end 133 of the second connecting rod 130 correspondingly pushes the extension member 123 upwards. Meanwhile, the first connecting rod 120 can be flipped by the second connecting rod 130 to pivotally rotate upwards (such as the anti-clockwise direction indicated by the arrow A). As indicated in the accompanying diagrams, the first connecting rod 120 can be flipped by the second connecting rod 130 to pivotally rotate in a direction inverse to the second connecting rod 130, so that the control wire 141 can be pulled by the first connecting rod 120.

Refer to FIG. 3B. The actuating end 133 of the second connecting rod 130 has a rolling member 134 formed of a roller and a ball bearing, for example. When the second connecting rod 130 is controlled through the second pulling portion 132 to pivotally rotate downwards, the rolling member 134 of the second connecting rod 130 rolls and contacts the extension member 123 of the first connecting rod 120, so that the first connecting rod 120 can be smoothly driven to move by the second connecting rod 130. The ball bearing 126 can reduce the friction between the first connecting rod 120 and the second connecting rod 130, so that the first connecting rod 120 and the second connecting rod 130 can rotate together. The rolling member 134 is not limited to be formed of a roller and a ball bearing, and can also be other structure with similar functions.

Figure 4A:
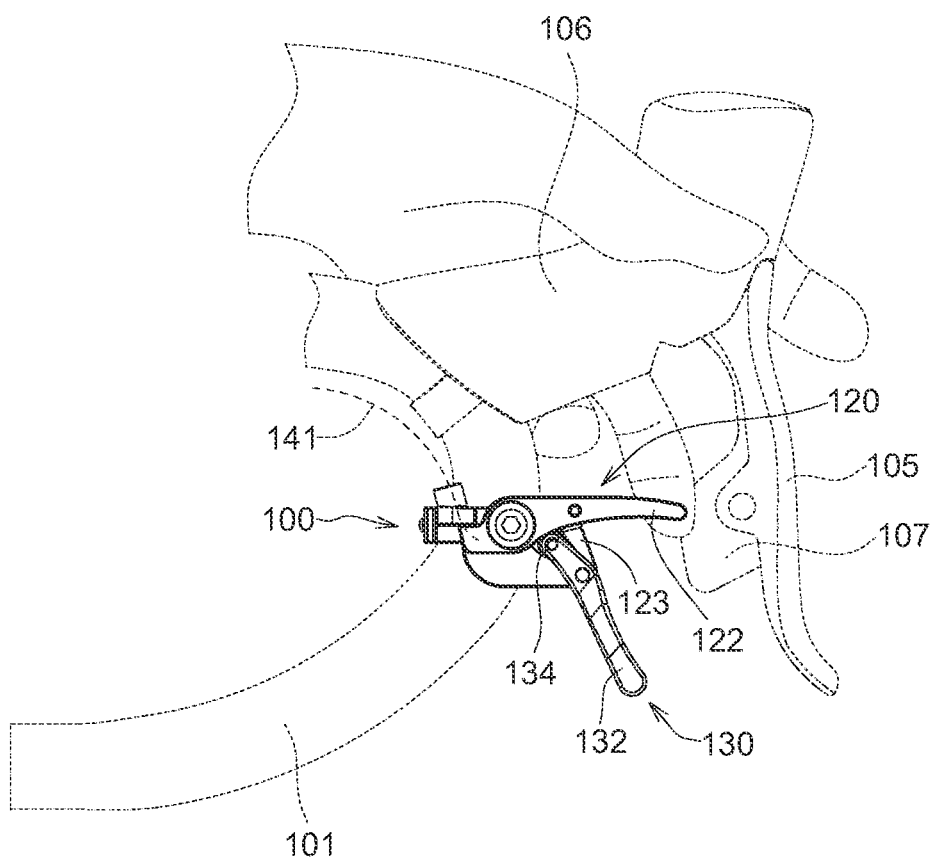
FIGS. 4A and 4B are operational diagrams corresponding to the handle of the bicycle control device of FIG. 3A and FIG. 3B being flipped upwards and clenched downwards.
Figure 4B:
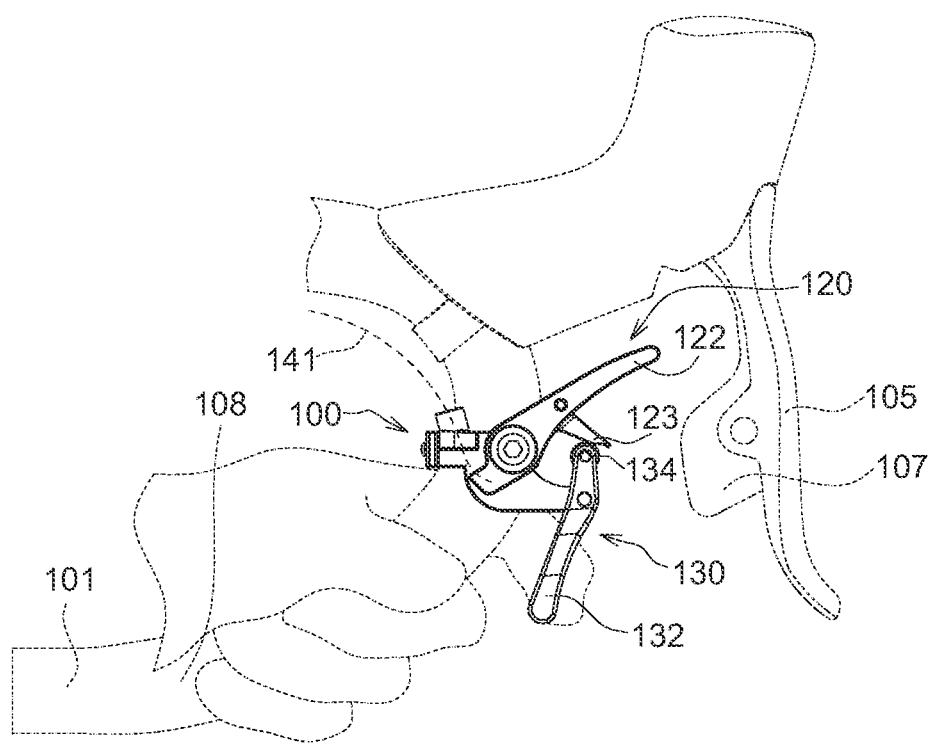

FIGS. 4A and 4B are operational diagrams corresponding to the handle of the bicycle control device 100 of FIG. 3A and FIG. 3B being flipped upwards and clenched downwards. As indicated in FIG. 4A, the rider's hand is at the upper handling position 106 of the curved handlebar 101 of the bicycle. During the ride, if the rider wants to adjust a component of the bicycle 150 in response to the current state of the road surface, the rider can flip the first connecting rod 120 with the index finger or the middle finger. As indicated in FIG. 4B, the rider's hand is at the lower handling position 108 of the curved handlebar 101 of the bicycle. During the ride, if the rider wants to adjust a component of the bicycle 150 in response to the current state of the road condition, the rider can flip the second connecting rod 130 with the index finger or the middle finger.

As indicated in FIG. 4A, when the rider's hand is at the upper handling position 106, the length of the rider's index finger or middle finger allows the rider to conveniently operate the first connecting rod 120 without changing the holding position (the holding position of the thumb and index finger remains unchanged), hence improving the operation of the conventional wire control device which requires thumb pressing. For the conventional wire control device to be conveniently operated through thumb pressing, the holding position of the rider's hand must be changed, or the maneuvering space of the thumb must be reduced.

As indicated in FIG. 4B, when the rider's hand is at the lower handling position 108, the length of the rider's index finger or middle finger allows the rider to conveniently operate the second connecting rod 130 without changing the holding position (the holding position of the thumb and index finger remains unchanged). Thus, no matter the rider's hand is at the upper handling position 106 or the lower handling position 108 of the curved handle 101, the grip of the rider's thumb will not be interfered with due to the holding region of the curved handlebar 101 being occupied by the bicycle control device 100.

As disclosed in above embodiment of the disclosure, the bicycle control device allows a road bike rider to change the operation mode to enhance the maneuverability and comfort. Besides, the bicycle control device of the disclosure has two connecting rods for the rider to flip and change the operation mode regardless of the rider's hand being at the upper or the lower handling position. Thus, the rider can adjust the riding posture, the height of the seat and/or the degree of shock absorber according to the state of the road. Besides, the bicycle control device of the disclosure is arranged at a suitable position and is easy to operate. While the wire control device of most conventional bicycles only has one operation mode and is unable to meet the requirement of multiple handling positions of the curved handle of the road bike, the bicycle control device of the disclosure has multiple operation modes in response to the change in the holding position of the road bike rider's hand and can meet actual needs.

While the disclosure has been described by way of example and in terms of the preferred embodiment(s), it is to be understood that the disclosure is not limited thereto. Based on the technical features embodiments of the present disclosure, a person ordinarily skilled in the art will be able to make various modifications and similar arrangements and procedures without breaching the spirit and scope of protection of the disclosure. Therefore, the scope of protection of the present disclosure should be accorded with what is defined in the appended claims.

What is claimed is:

1. A bicycle control device arranged on a curved handlebar of a bicycle and used to adjust a component of the bicycle, wherein the curved handlebar comprises a straight section and a curved section extending from both ends of the straight section, and the control device comprises:
    a fastener fixed on the curved handlebar, wherein the fastener has a hollow space for the curved handlebar to pass through, a first pivoting portion and a second pivoting portion;
    a first connecting rod having a third pivoting portion and a first pulling portion, wherein the first connecting rod is pivoted to the first pivoting portion through the third pivoting portion; and
    a second connecting rod having a fourth pivoting portion and a second pulling portion, wherein the second connecting rod is pivoted to the second pivoting portion through the fourth pivoting portion,
    wherein when the second connecting rod is controlled through the second pulling portion, the first connecting rod is driven to actuate.

2. The bicycle control device according to claim 1, wherein when the first connecting rod is controlled through the first pulling portion, the second connecting rod does not actuate.

3. The bicycle control device according to claim 1, wherein the first pulling portion is pivotally rotated around the third pivoting portion as a first axis, and the second pulling portion is pivotally rotated around the fourth pivoting portion as a second axis.

4. The bicycle control device according to claim 1, wherein the first pulling portion has an extension member, the extension member correspondingly contacts a top of an actuating end of the second connecting rod, and when the first connecting rod is pivotally rotated upwards through the first pulling portion, the extension member does not contact the actuating end of the second connecting rod.

5. The bicycle control device according to claim 4, wherein when the second connecting rod is pivotally rotated downwards through the second pulling portion, the actuating end of the second connecting rod correspondingly pushes the extension member upwards.

6. The bicycle control device according to claim 4, wherein the actuating end of the second connecting rod has a rolling member, and the rolling member rolls and contacts the extension member.

7. The bicycle control device according to claim 3, wherein the first axis and the second axis rotate but do not move.

8. The bicycle control device according to claim 3, wherein a pivoting direction of the first pulling portion is inverse to a pivoting direction of the second pulling portion.

9. The bicycle control device according to claim 1, further comprising a control wire, wherein the control wire passes through a through hole of the fastener to be connected to the first connecting rod, another end of the control wire is connected to the component of the bicycle, and when the control wire is pulled by the first connecting rod, the control wire activates a switch of the component.

\* \* \* \* \*